(12) United States Patent
Ogura et al.

(10) Patent No.: US 11,293,755 B2
(45) Date of Patent: Apr. 5, 2022

(54) VIBRATOR DEVICE

(71) Applicant: Seiko Epson Corporation, Tokyo (JP)

(72) Inventors: Seiichiro Ogura, Minowa (JP); Keiichi Yamaguchi, Ina (JP); Ryuta Nishizawa, Nagano (JP)

(73) Assignee: Seiko Epson Corporation

( * ) Notice: Subject to any disclaimer, the term of this patent is extended or adjusted under 35 U.S.C. 154(b) by 41 days.

(21) Appl. No.: 17/005,466

(22) Filed: Aug. 28, 2020

(65) Prior Publication Data

US 2021/0063155 A1 Mar. 4, 2021

(30) Foreign Application Priority Data

Aug. 29, 2019 (JP) .............................. JP2019-156779

(51) Int. Cl.
*G01C 19/5642* (2012.01)

(52) U.S. Cl.
CPC ................................ *G01C 19/5642* (2013.01)

(58) Field of Classification Search
CPC ......................... G01C 19/5621; G01C 19/5642
USPC ...................................................... 73/504.12
See application file for complete search history.

(56) References Cited

U.S. PATENT DOCUMENTS

| | | | | |
|---|---|---|---|---|
| 5,515,724 A | * | 5/1996 | Greiff ................ | G01C 19/5719 73/504.12 |
| 7,051,591 B2 | * | 5/2006 | Chaumet ............ | G01C 19/5747 73/504.12 |
| 7,421,898 B2 | * | 9/2008 | Acar .................. | G01C 19/5719 73/504.12 |
| 2006/0162446 A1 | * | 7/2006 | Ogura ................ | G01C 19/5607 73/504.12 |
| 2007/0272015 A1 | * | 11/2007 | Kazama ............. | G01P 15/125 73/504.08 |

(Continued)

FOREIGN PATENT DOCUMENTS

| | | |
|---|---|---|
| JP | 2017-026336 A | 2/2017 |
| JP | 2018-159674 A | 10/2018 |
| JP | 2019-102858 A | 6/2019 |

OTHER PUBLICATIONS

Du et al. High Dynamic Micro Vibrator with Integrated Optical Displacement Detector for In-Situ Self-Calibration of MEMS Inertial Sensors. Sensors. 2018;18:2055. doi: 10.3390/s18072055 (Year: 2018).*

*Primary Examiner* — Nimeshkumar D Patel
*Assistant Examiner* — Jean F Morello
(74) *Attorney, Agent, or Firm* — Harness, Dickey & Pierce, P.L.C.

(57) ABSTRACT

A vibrator device includes a vibrator element, a base, and a support configured to support the vibrator element with respect to the base. The support includes a frame shaped like a frame, a base mount disposed outside the frame, and fixed to the base, an element holder which is disposed inside the frame, and on which the vibrator element is mounted, a pair of first beams which extend along a first direction from the element holder, and couple the element holder and the frame to each other, and a pair of second beams which extend along a second direction from the frame, and couple the frame and the base mount to each other, and $W1^2/L1<30$, in which a length in the first direction of the first beam is L1 (μm), and a width in a direction perpendicular to the first direction of the first beam is W1 (μm).

6 Claims, 9 Drawing Sheets

(56) References Cited

U.S. PATENT DOCUMENTS

| | | |
|---|---|---|
| 2016/0139173 A1* | 5/2016 | El-Gamal ............. B81B 3/0021 |
| | | 73/514.32 |
| 2017/0016725 A1 | 1/2017 | Shimizu et al. |
| 2018/0274922 A1 | 9/2018 | Nishizawa et al. |
| 2019/0165759 A1 | 5/2019 | Nishizawa et al. |
| 2019/0301868 A1* | 10/2019 | Yamaguchi ........ G01C 19/5607 |

\* cited by examiner

VIBRATOR DEVICE

The present application is based on, and claims priority from JP Application Serial Number 2019-156779, filed Aug. 29, 2019, the disclosure of which is hereby incorporated by reference herein in its entirety.

BACKGROUND

1. Technical Field

The present disclosure relates to a vibrator device.

2. Related Art

In JP-A-2019-102858 (Document 1), there is described a vibrator device having a circuit element, a vibrator element, and a relay substrate for fixing the vibrator element to the circuit element. Further, the relay substrate forms a gimbal structure, and has a first part shaped like a frame and fixed to the circuit element, a second part shaped like a frame and disposed inside the first part, a third part which is disposed inside the second part and to which the vibrator element is fixed, first beams for coupling the first part and the second part to each other, and second beams for coupling the second part and the third part to each other. Due to such a relay substrate, transmission of a stress to the vibrator element is suppressed. Further, in JP-A-2017-026336 (Document 2), as a support structure for a gyro element, there is described a configuration of supporting the gyro element above a TAB substrate with inner leads.

When mounting the gyro element described in Document 2 on the relay substrate shaped like a gimbal described in Document 1 instead of the support structure described in Document 2, the rigidity around a Z axis of the second beams, namely the detection axis of the gyro element becomes excessively high depending on the dimension of the second beams. When the rigidity around the Z axis of the second beams becomes excessively high, there is a possibility that the detection vibration of the gyro element is hindered, and thus, the detection sensitivity of the gyro element degrades.

SUMMARY

A vibrator device according to an application example includes a vibrator element configured to perform a detection vibration in accordance with a physical quantity around a detection axis, a base, and a support configured to support the vibrator element with respect to the base, wherein the support includes, in a plan view from a thickness direction of the support, a frame shaped like a frame, a base mount disposed outside the frame, and fixed to the base, an element holder which is disposed inside the frame, and on which the vibrator element is mounted, a pair of first beams which extend along a first direction from the element holder, and couple the element holder and the frame to each other, and a pair of second beams which extend along a second direction different from the first direction from the frame, and couple the frame and the base mount to each other, and $W1^2/L1<30$ in which, in plan view, a length in the first direction of the first beam is L1 (μm), and a width in a direction perpendicular to the first direction of the first beam is W1 (μm).

In the vibrator device according to the application example, $W1^2/L1<12.5$ may be satisfied.

In the vibrator device according to the application example, defining three axes perpendicular to each other as an A axis, a B axis, and a C axis, the thickness direction of the support may be parallel to the C axis, and the vibrator element may include an element base fixed to the element holder, a pair of detection arms extending along the B axis from the element base, a pair of coupling arms extending along the A axis from the element base, a pair of the drive arms extending along the B axis from a tip of one of the coupling arms, and a pair of the drive arms extending along the B axis from a tip of another of the coupling arms.

In the vibrator device according to the application example, the first direction may be parallel to the A axis, and the second direction may be parallel to the B axis.

In the vibrator device according to the application example, in a plan view viewed from a direction along the C axis, the element holder and the element base may be the same in shape.

In the vibrator device according to the application example, the support may include a pair of third beams which extend along the first direction from the frame, and couple the frame and the base mount to each other, and the pair of third beams and the pair of first beams may be arranged in alignment with each other.

DESCRIPTION OF EXEMPLARY EMBODIMENTS

A vibrator device according to an application example will hereinafter be described in detail based on some embodiments shown in the accompanying drawings.

First Embodiment

Figure 1:
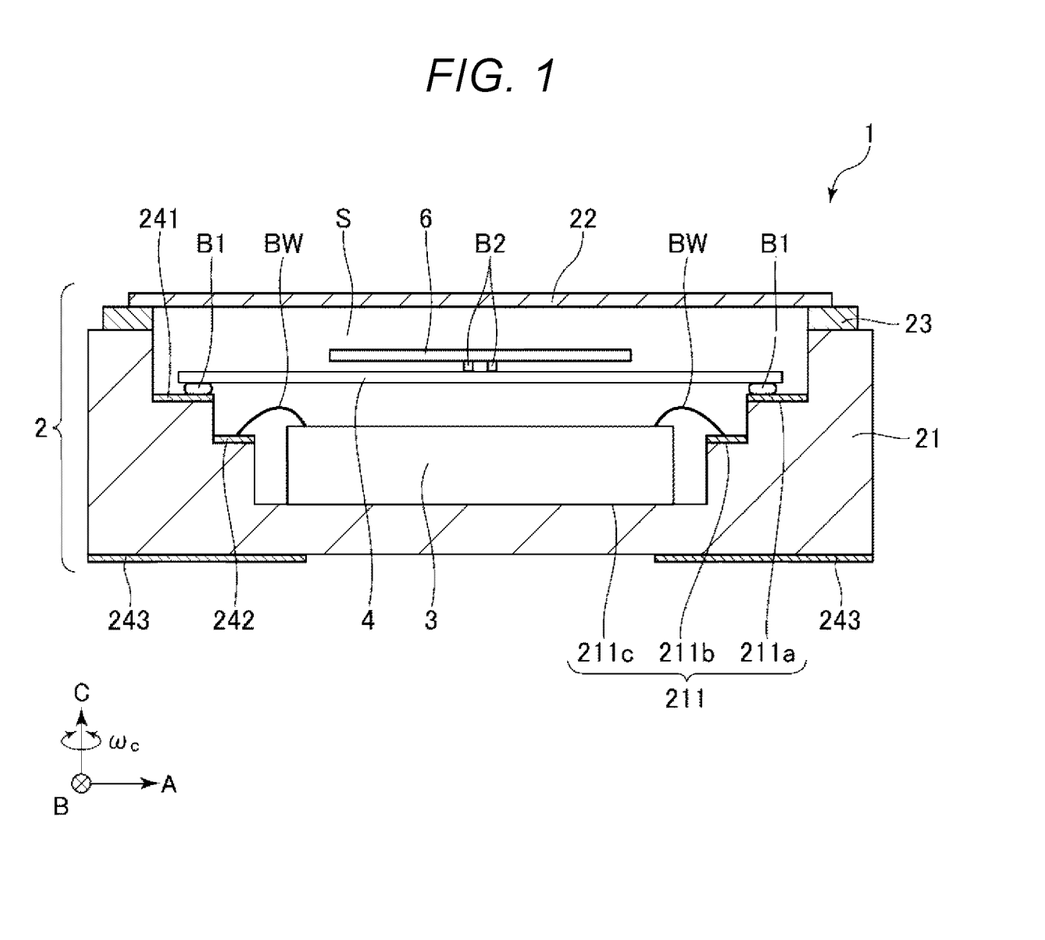
FIG. 1 is a cross-sectional view showing a vibrator device according to a first embodiment.
Figure 2:
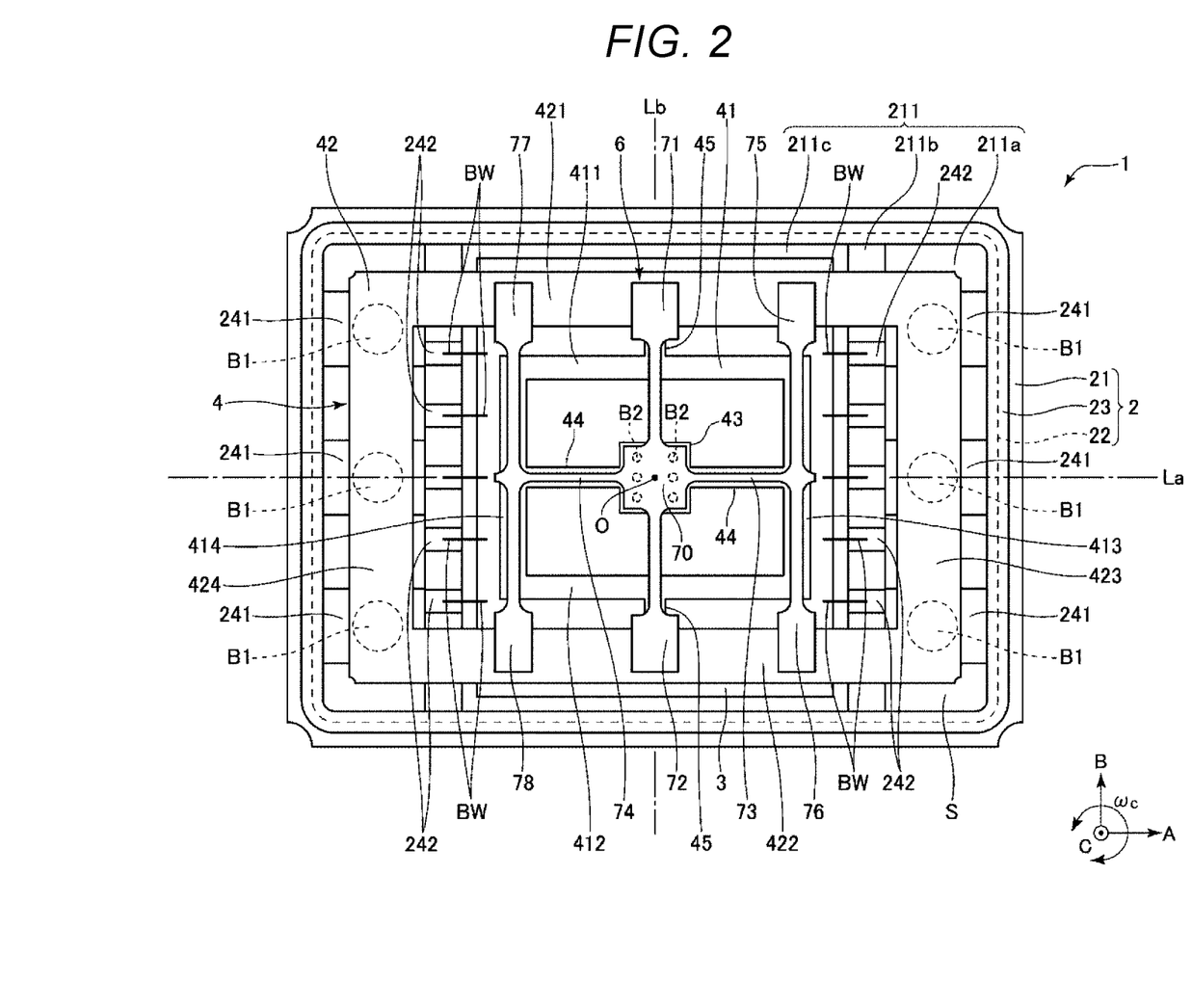
FIG. 2 is a plan view showing the vibrator device shown in FIG. 1.
Figure 3:
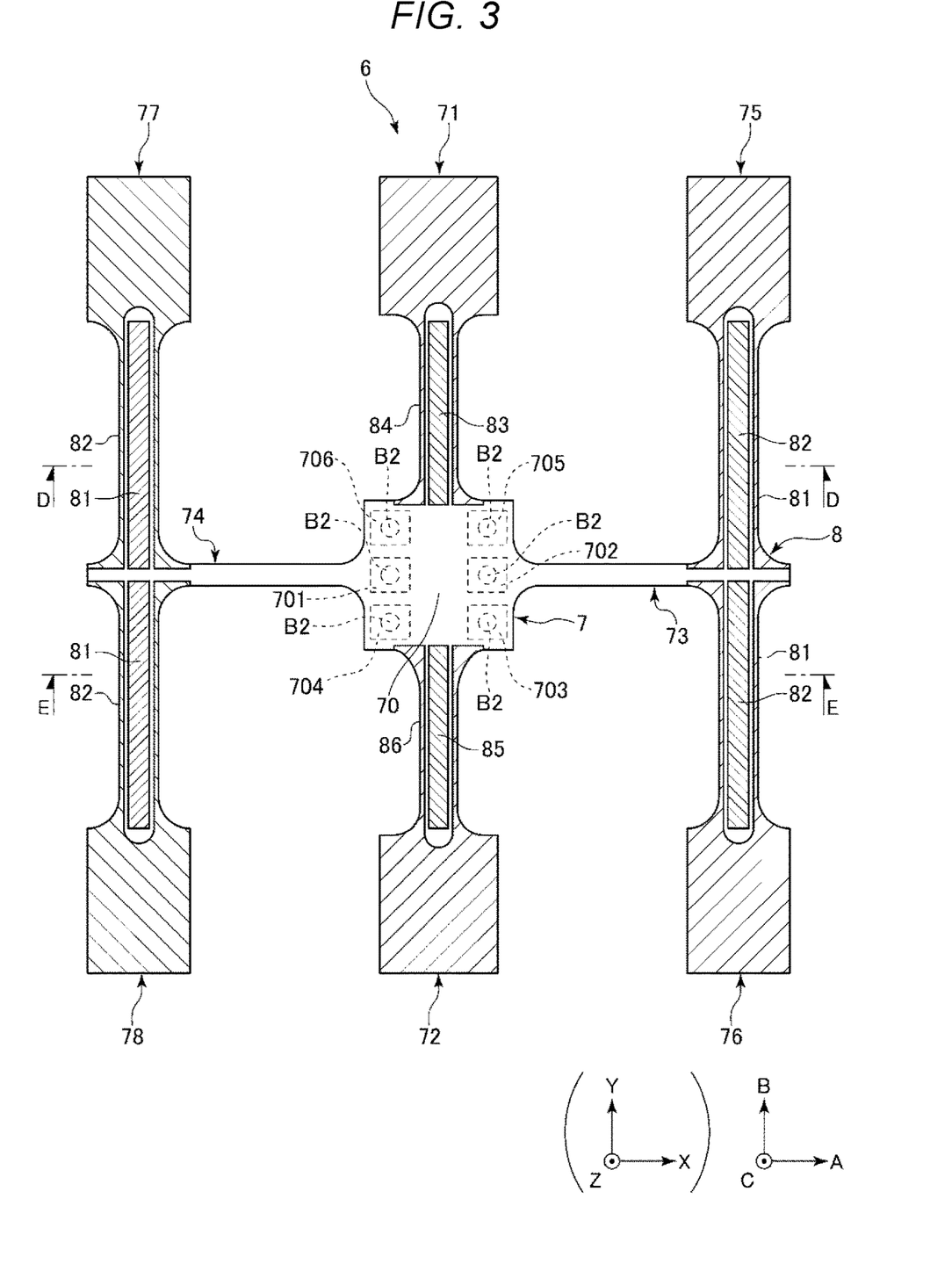
FIG. 3 is a plan view showing a vibrator element provided to the vibrator device shown in FIG. 1.
Figure 4:
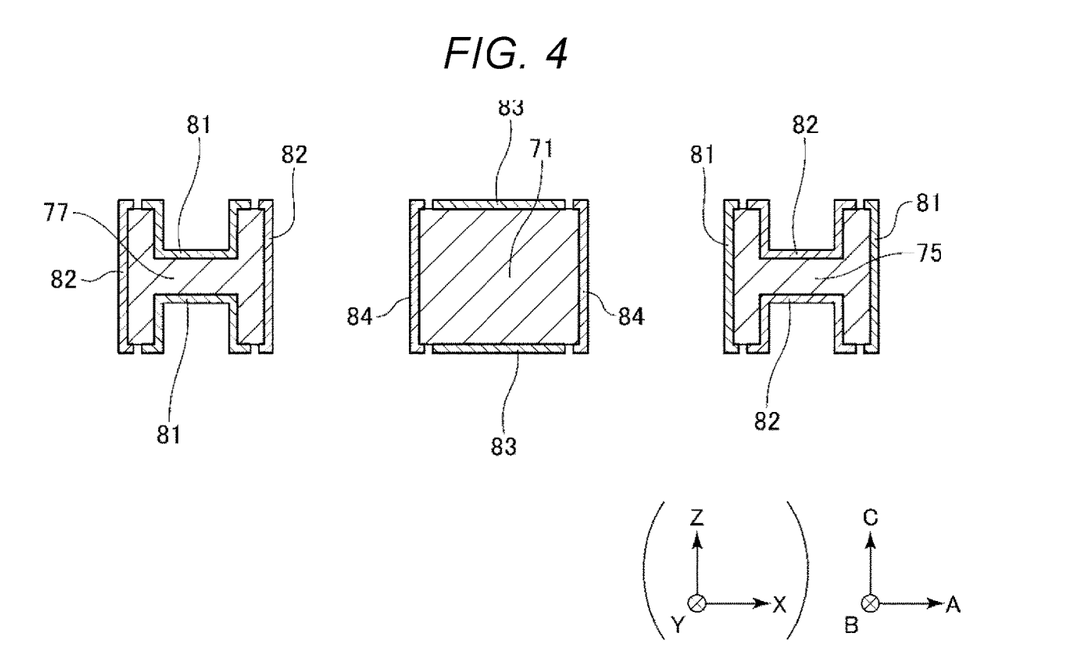
FIG. 4 is a cross-sectional view along the line D-D in FIG. 3.
Figure 5:
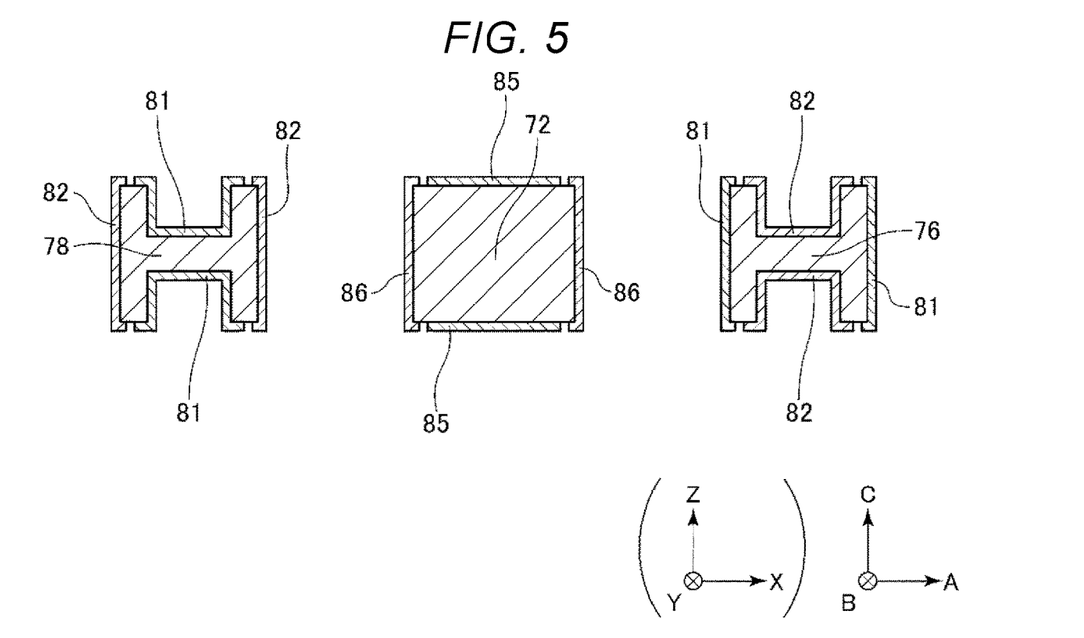
FIG. 5 is a cross-sectional view along the line E-E in FIG. 3.
Figure 6:
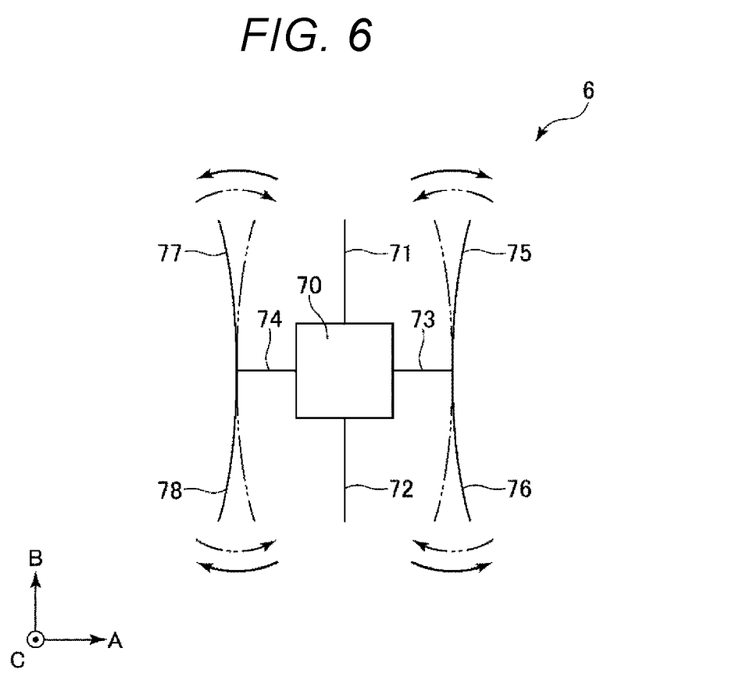
FIG. 6 is a schematic diagram for explaining drive of the vibrator element shown in FIG. 3.
Figure 7:
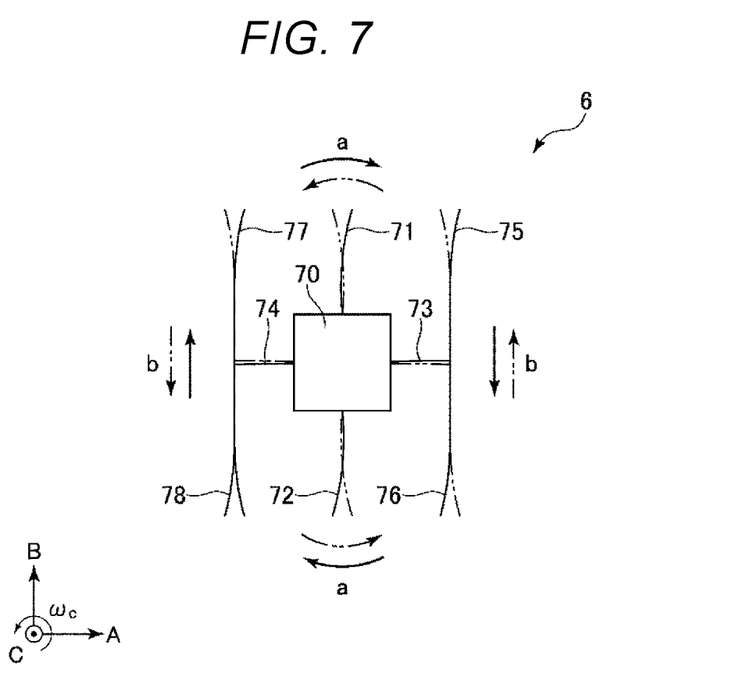
FIG. 7 is a schematic diagram for explaining drive of the vibrator element shown in FIG. 3.
Figure 8:
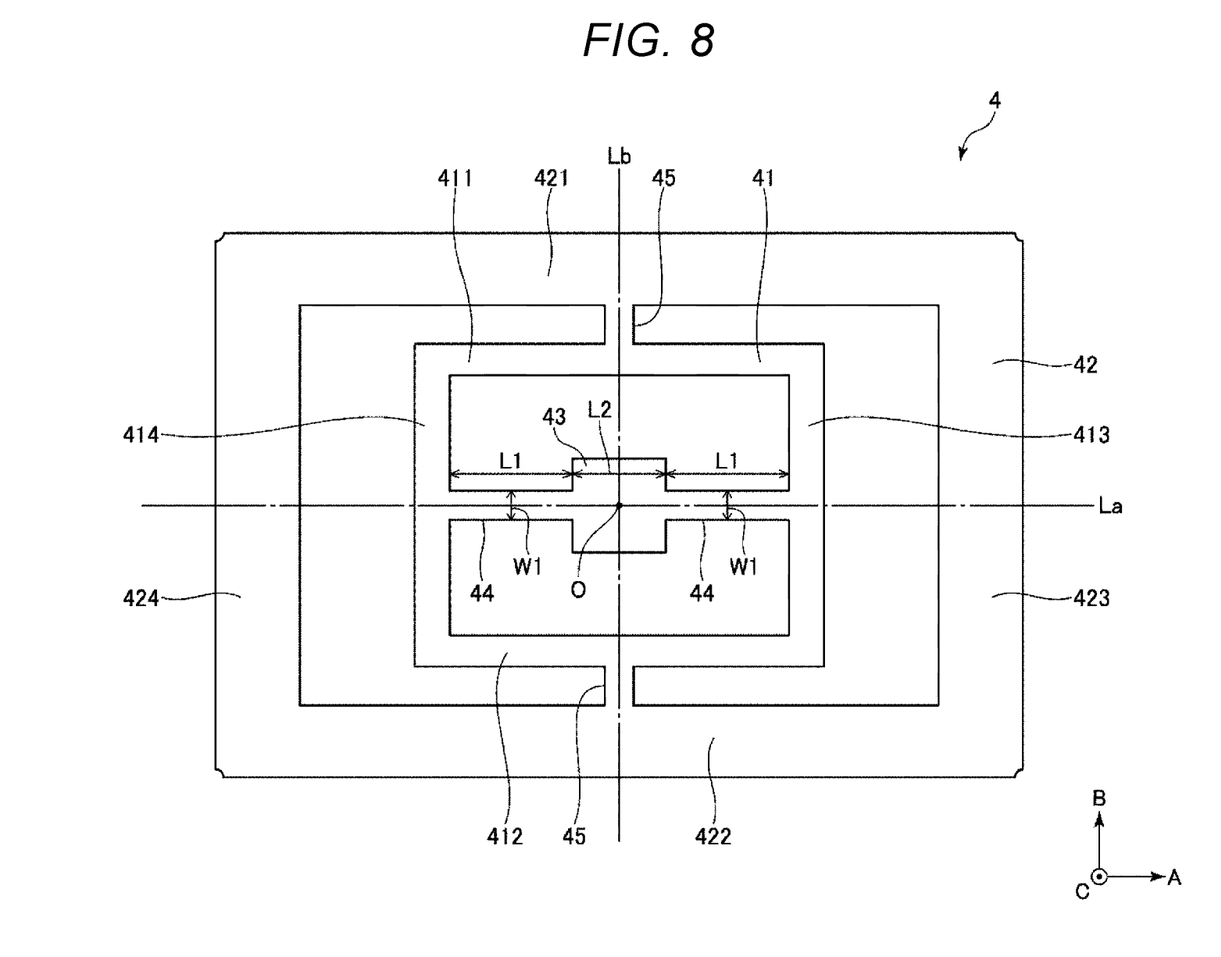
FIG. 8 is a plan view of a support.
Figure 9:
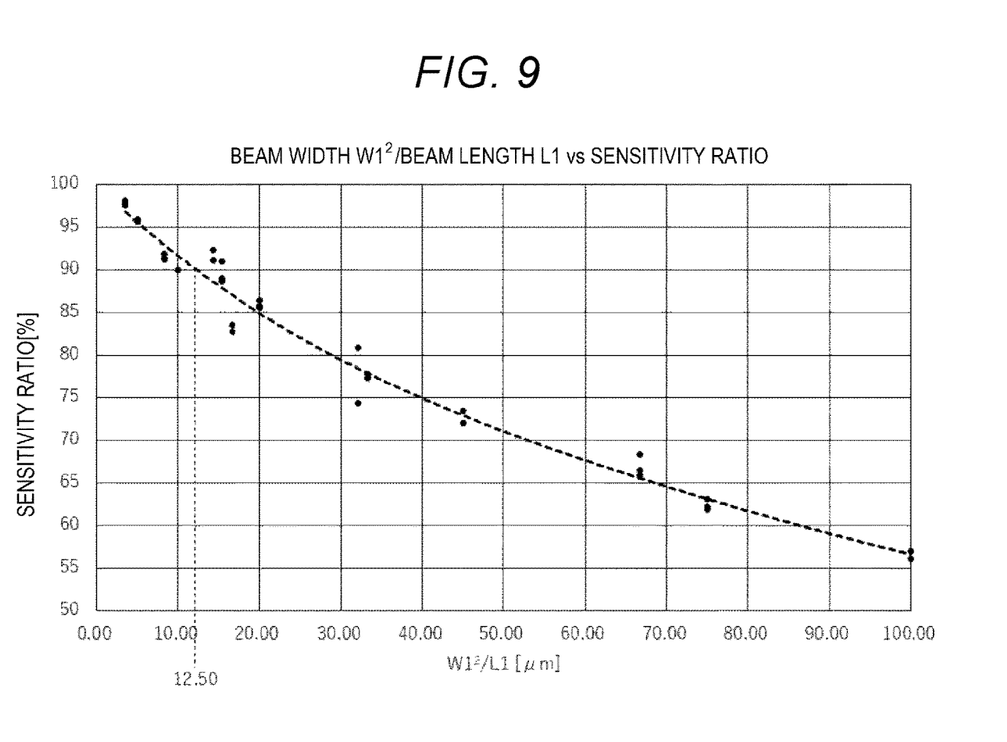
FIG. 9 is a graph showing a relationship between $W1^2/L1$ and the sensitivity ratio.

FIG. 1 is a cross-sectional view showing a vibrator device according to a first embodiment. FIG. 2 is a plan view showing the vibrator device shown in FIG. 1. FIG. 3 is a plan view showing a vibrator element provided to the vibrator device shown in FIG. 1. FIG. 4 is a cross-sectional view along the line D-D in FIG. 3. FIG. 5 is a cross-sectional view along the line E-E in FIG. 3. FIG. 6 and FIG. 7 are each a schematic diagram for explaining drive of the vibrator element shown in FIG. 3. FIG. 8 is a plan view of a support. FIG. 9 is a graph showing a relationship between $W1^2/L1$ and the sensitivity ratio.

It should be noted that in FIG. 1 through FIG. 8, there are shown an A axis, a B axis, and a C axis as three axes perpendicular to each other for the sake of convenience of explanation. Further, hereinafter, the tip side of the arrow of each of the axes is also referred to as a "positive side," and the opposite side is also referred to as a "negative side." Further, the positive side and the negative side are also referred to as "both sides." Further, the positive side of the C axis is also referred to as an "upper side," and the negative side thereof is also referred to as a "lower side." Further, the plan view from a thickness direction of the support 4, namely a direction along the C axis, is also referred to simply as a "plan view."

The vibrator device 1 shown in FIG. 1 is a physical quantity sensor for detecting angular velocity ωc defining the C axis as the detection axis. As described above, by using the vibrator device 1 as the physical quantity sensor, it is possible to install the vibrator device 1 in a wide variety of electronic apparatuses, and thus, the vibrator device 1 which has a high demand, and is high in convenience is achieved. Such a vibrator device 1 has a package 2, a circuit element 3 housed in the package 2, the support 4, and a vibrator element 6.

The package 2 has a base 21 provided with a recessed part 211 opening in an upper surface, and a lid 22 which closes the opening of the recessed part 211 and is bonded to the upper surface of the base 21 via a bonding member 23. The recessed part 211 forms an internal space S inside the package 2, and the circuit element 3, the support 4, and the vibrator element 6 are each housed in the internal space S. For example, the base 21 can be formed of ceramics such as alumina, and the lid 22 can be formed of a metal material such as kovar. It should be noted that the constituent material of each of the base 21 and the lid 22 is not particularly limited.

The internal space S is airtightly sealed, and is set in a reduced-pressure state, and more preferably a state approximate to a vacuum state. Thus, the viscosity resistance reduces and the vibration characteristics of the vibrator element 6 are improved. It should be noted that the atmosphere in the internal space S is not particularly limited, but can also be, for example, in the atmospheric pressure state or a pressurized state.

Further, the recessed part 211 is constituted by a plurality of recessed parts, and has a recessed part 211a, a recessed part 211b, and a recessed part 211c wherein the recessed part 211a opens in the upper surface of the base 21, the recessed part 211b opens in a bottom surface of the recessed part 211a and is smaller in opening width than the recessed part 211a, and the recessed part 211c opens in a bottom surface of the recessed part 211b and is smaller in opening width than the recessed part 211b. Further, to the bottom surface of the recessed part 211a, there is fixed the support 4 in a state of supporting the vibrator element 6, and to the bottom surface of the recessed part 211c, there is fixed the circuit element 3.

Further, as shown in FIG. 2, in the internal space S, the vibrator element 6, the support 4, and the circuit element 3 are disposed so as to overlap each other in a plan view. In other words, the vibrator element 6, the support 4, and the circuit element 3 are arranged along the C axis. Thus, it is possible to suppress the planar spread towards the directions along the A axis and the B axis of the package 2, and thus, it is possible to achieve reduction in size of the vibrator device 1. Further, the support 4 is located between the vibrator element 6 and the circuit element 3, and supports the vibrator element 6 so as to hold the vibrator element 6 from the lower side, namely the negative side of the C axis.

Further, as shown in FIG. 1 and FIG. 2, on the bottom surface of the recessed part 211a, there is disposed a plurality of internal terminals 241, on the bottom surface of the recessed part 211b, there is disposed a plurality of internal terminals 242, and on the lower surface of the base 21, there is disposed a plurality of external terminals 243. The internal terminals 241, 242 and the external terminals 243 described above are electrically coupled via interconnections not shown formed inside the base 21. Further, the internal terminals 241 are electrically coupled to the vibrator element 6 via bonding members B1, B2 having electrical conductivity and the support 4, and the internal terminals 242 are electrically coupled to the circuit element 3 via bonding wires BW.

The vibrator element 6 is an angular velocity sensor element for detecting the angular velocity ωc defining the C axis as the detection axis as the physical quantity sensor element. As shown in FIG. 3, the vibrator element 6 has a vibrating substrate 7, and electrodes 8 disposed on a surface of the vibrating substrate 7. The vibrating substrate 7 is formed of a Z-cut quartz crystal substrate. The Z-cut quartz crystal substrate has spread in an X-Y plane defined by an X axis as the electrical axis and a Y axis as the mechanical axis, and has a thickness in a direction along a Z axis as an optical axis, the electrical axis, the mechanical axis, and the optical axis being crystal axes of the quartz crystal.

The vibrating substrate 7 has an element base 70, a pair of detection arms 71, 72, a pair of coupling arms 73, 74, a pair of drive arms 75, 76, and a pair of drive arms 77, 78, wherein the element base 70 is located in a central part, the pair of detection arms 71, 72 extend toward both sides in a direction along the B axis from the element base 70, the pair of coupling arms 73, 74 extend toward both sides in a direction along the A axis from the element base 70, the pair of drive arms 75, 76 extend toward both sides in a direction along the B axis from a tip of the coupling arm 73, and the pair of drive arms 77, 78 extend toward both sides in a direction along the B axis from a tip of the coupling arm 74. By using the vibrating substrate 7 having such a shape, the vibrator element 6 having superior vibration balance is obtained.

Further, as shown in FIG. 4 and FIG. 5, the drive arms 75 through 78 each have a groove opening in the upper surface and a groove opening in the lower surface to form a substantially H-shaped cross-sectional shape. It should be noted that regarding the detection arms 71, 72, it is possible to provide a groove opening in the upper surface and a groove opening in the lower surface to form a substantially H-shaped cross-sectional shape.

As shown in FIG. 3, the electrodes 8 include a drive signal electrode 81, a drive ground electrode 82, a first detection signal electrode 83, a first detection ground electrode 84, a second detection signal electrode 85, and a second detection ground electrode 86. The drive signal electrode 81 is disposed on the both side surfaces of each of the drive arms 75, 76, and the upper surface and the lower surface of each of the drive arms 77, 78. Meanwhile, the drive ground electrode 82 is disposed on the upper surface and the lower surface of each of the drive arms 75, 76, and the both side surfaces of each of the drive arms 77, 78. Further, the first detection signal electrode 83 is disposed on the upper surface and the lower surface of the detection arm 71, and the first detection ground electrode 84 is disposed on the both side surfaces of the detection arm 71. Meanwhile, the second detection signal electrode 85 is disposed on the upper surface and the lower surface of the detection arm 72, and the second detection ground electrode 86 is disposed on the both side surfaces of the detection arm 72.

Further, these electrodes 81 through 86 are each laid around to the lower surface of the element base 70. Further, as shown in FIG. 3, on the lower surface of the element base 70, there are disposed a terminal 701 electrically coupled to the drive signal electrode 81, a terminal 702 electrically coupled to the drive ground electrode 82, a terminal 703 electrically coupled to the first detection signal electrode 83, a terminal 704 electrically coupled to the first detection ground electrode 84, a terminal 705 electrically coupled to the second detection signal electrode 85, and a terminal 706 electrically coupled to the second detection ground electrode 86.

Such a vibrator element 6 detects the angular velocity ωc in the following manner. Firstly, when applying a drive signal between the drive signal electrode 81 and the drive ground electrode 82, the drive arms 75 through 78 flexurally vibrate as represented by the arrows shown in FIG. 6. Hereinafter, this drive mode is referred to as a drive vibration mode. Further, when the angular velocity ωc is applied to the vibrator element 6 in the state of performing the drive in the drive vibration mode, a detection vibration mode shown in FIG. 7 is newly excited. In the detection vibration mode, a Coriolis force acts on the drive arms 75 through 78 to excite the vibration in a direction represented by the arrows b, and in concert with this vibration, the detection vibration due to the flexural vibration occurs in a direction represented by the arrows a in the detection arms 71, 72. A charge generated in the detection arm 71 due to such a detection vibration mode is taken out between the first detection signal electrode 83 and the first detection ground electrode 84 as a first detection signal, a charge generated in the detection arm 72 is taken out between the second detection signal electrode 85 and the second detection ground electrode 86 as a second detection signal, and it is possible to detect the angular velocity ωc based on these first and second detection signals.

Going back to FIG. 1, the circuit element 3 is fixed to the bottom surface of the recessed part 211c. The circuit element 3 includes a drive circuit and a detection circuit for driving the vibrator element 6 to detect the angular velocity we applied to the vibrator element 6. It should be noted that the circuit element 3 is not particularly limited, but can include other circuits such as a temperature compensation circuit.

As shown in FIG. 1, the support 4 intervenes between the base 21 and the vibrator element 6. The support 4 mainly has a function of absorbing or relaxing the stress caused by a deformation of the base 21 to thereby make it difficult for the stress to reach the vibrator element 6.

Such a support 4 is provided with a gimbal structure. Specifically, as shown in FIG. 2 and FIG. 8, in plan view from a direction along the C axis, the support 4 has a frame 41 shaped like a frame, a base mount 42 which is shaped like a frame, disposed outside the frame 41, and fixed to the base 21, an element holder 43 which is disposed inside the frame 41 and on which the vibrator element 6 is mounted, a pair of first beams 44, 44 which extend toward the both sides in a direction along the A axis from the element holder 43 and couple the element holder 43 and the frame 41 to each other, and a pair of second beams 45, 45 which extend toward the both sides in a direction along the B axis from the frame 41 and couple the frame 41 and the base mount 42 to each other. It should be noted that in plan view in the direction along the C axis, an imaginary straight line passing through the center O of the element holder 43 and parallel to the A axis is hereinafter defined as an imaginary straight line La, and an imaginary straight line passing through the center O and parallel to the B axis is hereinafter defined as an imaginary straight line Lb. In the present embodiment, the frame 41, the base mount 42, the element holder 43, the pair of first beams 44, 44, and the pair of second beams 45, 45 are all line-symmetrically arranged about the imaginary straight line La, and at the same time, line-symmetrically arranged about the imaginary straight line Lb, but this is not a limitation.

The frame 41 is shaped like a rectangular frame, and has a pair of edge parts 411, 412 extending in a direction along the A axis, and a pair of edge parts 413, 414 extending in a direction along the B axis. Similarly, the base mount 42 is shaped like a rectangular frame, and has a pair of edge parts 421, 422 extending in a direction along the A axis, and a pair of edge parts 423, 424 extending in a direction along the B axis. In particular, in the present embodiment, in plan view in the direction along the C axis, the edge part 413 of the frame 41 overlaps the drive arms 75, 76 of the vibrator element 6, and the edge part 414 of the frame 41 overlaps the drive arms 77, 78 of the vibrator element 6.

Further, the pair of first beams 44, 44 are respectively located on the both sides in a direction along the A axis of the element holder 43, and couple the element holder 43 and the frame 41 to each other so as to achieve the fixed-fixed support of the element holder 43. Further, the pair of first beams 44, 44 are arranged on a straight line along the imaginary straight line La. Meanwhile, the pair of second beams 45, 45 are respectively located on the both sides in a direction along the B axis of the frame 41, and couple the frame 41 and the base mount 42 to each other so as to achieve the fixed-fixed support of the frame 41. Further, the pair of second beams 45, 45 are arranged on a straight line along the imaginary straight line Lb. In other words, one of the second beams 45 couples central portions in the extending direction of the edge parts 411, 421 to each other, and the other of the second beams 45 couples central portions in the extending direction of the edge parts 412, 422 to each other.

By making the extending direction of the first beams 44, 44 and the extending direction of the second beams 45, 45 perpendicular to each other as described above, it is possible to effectively absorb or relax the stress with the support 4. Further, by extending the first beams 44, 44 in a direction along the A axis as the same direction as the extending direction of the coupling arms 73, 74, it is possible to easily ensure an equivalent length to those of the coupling arms 73, 74. Therefore, it becomes easy to increase the length of the first beams 44, 44, namely L1 described later. In particular, as described above, in the present embodiment, in plan view in the direction along the C axis, the edge part 413 of the frame 41 overlaps the drive arms 75, 76, and the edge part 414 of the frame 41 overlaps the drive arms 77, 78, and therefore, the length of the first beams 44, 44 is substantially the same as the lengths of the coupling arms 73, 74.

In such a support 4, the element base 70 of the vibrator element 6 is fixed to an upper surface of the element holder 43 via the bonding members B2 having electrical conductivity, and the edge parts 423, 424 of the base mount 42 are fixed to the bottom surface of the recessed part 211a via the bonding members B1 having electrical conductivity. By making the support 4 intervene between the vibrator element 6 and the base 21 as described above, it is possible to absorb or relax the stress propagating from the base 21 with the support 4, and thus, it becomes difficult for the stress to reach the vibrator element 6. Therefore, it is possible to effectively prevent the degradation and the fluctuation of the vibration characteristics of the vibrator element 6.

It should be noted that the bonding members B1, B2 are not particularly limited as long as both of the electrical conductivity and the bonding property are provided, and it is possible to use, for example, a variety of metal bumps such as gold bumps, silver bumps, copper bumps, or solder bumps, or an electrically conductive adhesive having an electrically conductive filler such as a silver filler dispersed in a variety of adhesives such as a polyimide type adhesive, an epoxy type adhesive, a silicone type adhesive, or an acrylic adhesive. When using the metal bumps which are in the former group as the bonding members B1, B2, it is possible to suppress generation of a gas from the bonding members B1, B2, and it is possible to effectively prevent a change in environment, in particular rise in pressure, of the internal space S. On the other hand, when using the electrically conductive adhesive which is in the latter group as the bonding members B1, B2, the bonding members B1, B2 become relatively soft, and it is possible to absorb or relax the stress described above also in the bonding members B1, B2.

In the present embodiment, the electrically conductive adhesive is used as the bonding members B1, and the metal bumps are used as the bonding members B2. By using the electrically conductive adhesive as the bonding members B1 for bonding the support 4 and the base 21 as materials different in type from each other, the thermal stress caused by a difference in thermal expansion coefficient therebetween can effectively be absorbed or relaxed with the bonding members B1. On the other hand, since the support 4 and the vibrator element 6 are bonded to each other with the six bonding members B2 disposed in a relatively small area, by using the metal bumps as the bonding members B2, there is prevented wetting spread as in the case of the electrically conductive adhesive, and thus, it is possible to effectively prevent the bonding members B2 from making contact with each other.

Such a support 4 is formed of a quartz crystal substrate. By forming the support substrate 4 of the quartz crystal substrate similarly to the vibrating substrate 7 as described above, it is possible to make the support 4 and the vibrating substrate 7 substantially equal in thermal expansion coefficient to each other. Therefore, the thermal stress caused by the difference in thermal expansion coefficient from each other does not substantially occur between the support 4 and the vibrating substrate 7, and it becomes more difficult for the vibrator element 6 to be subjected to stress. Therefore, it is possible to more effectively prevent the degradation and the fluctuation of the vibration characteristics of the vibrator element 6.

In particular, the support 4 is formed of the quartz crystal substrate with the same cutting angle as that in the vibrating substrate 7 provided to the vibrator element 6. In the present embodiment, since the vibrating substrate 7 is formed of a Z-cut quartz crystal substrate, the support 4 is also formed of the Z-cut quartz crystal substrate. Further, the directions of the crystal axes of the support 4 coincide with the directions of the crystal axes of the vibrating substrate 7. In other words, the support 4 and the vibrating substrate 7 coincide with each other in the X axis, the Y axis, and the Z axis. Since the quartz crystal is different in thermal expansion coefficient between the direction along the X axis, the direction along the Y axis, and the direction along the Z axis, by making the support 4 and the vibrating substrate 7 the same in cutting angle to uniform the directions of the crystal axes, it becomes more difficult for the thermal stress described above to occur between the support 4 and the vibrating substrate 7. Therefore, it becomes more difficult for the vibrator element 6 to be subjected to stress, and thus, it is possible to more effectively prevent the degradation and the fluctuation of the vibration characteristics of the vibrator element 6.

It should be noted that the support 4 is not limited thereto, but can also be different in directions of the crystal axes from the vibrating substrate 7 although the same in cutting angle as the vibrating substrate 7. Further, the support 4 can also be formed of a quartz crystal substrate different in cutting angle from the vibrating substrate 7. Further, the support 4 is not required to be formed of the quartz crystal substrate, and in this case, the support 4 can be formed of, for example, a silicon substrate or a resin substrate. In this case, it is preferable for the constituent material of the support 4 to be a material having a difference in thermal expansion coefficient from the quartz crystal smaller than a difference in thermal expansion coefficient between the quartz crystal and the constituent material of the base 21.

Further, on the support 4, there are disposed wiring patterns not shown for electrically coupling the vibrator element 6 and the internal terminals 241 to each other. The wiring patterns electrically couple the terminals 701 through 706 to the internal terminals 241.

Then, the dimensions of the pair of first beams 44, 44 will be described. As shown in FIG. 8, when defining the length in the direction along the A axis of each of the first beams 44 as a length L1 (μm), and the length in the direction along the B axis of each of the first beams 44 as a width W1 (μm), each of the first beams 44, 44 satisfies the relationship of $W1^2/L1<30$, and in particular, preferably satisfies the relationship of $W1^2/L1<12.5$. By satisfying such a relationship, the length L1 becomes sufficiently longer than the width W1, and each of the first beams 44, 44 becomes easy to elastically deform in a direction along the B axis. Therefore, it becomes easy for the element holder 43 supported by the first beams 44, 44 to rotate around the C axis with respect to the frame 41. By making the element holder 43 easy to rotate around the C axis as described above, the detection vibration mode occurring in the vibrator element 6 becomes difficult to hinder. Therefore, it is possible to effectively prevent the degradation of the detection sensitivity of the vibrator element 6.

It should be noted that it is allowable for the first beam 44 located on the positive side in the A axis of the center O and the first beam 44 located on the negative side in the A axis of the center O to be slightly different in the length L1, but in this case, it is possible to define an average value of the both parties as the length L1. Similarly, it is allowable for the first beam 44 located on the positive side in the A axis of the center O and the first beam 44 located on the negative side in the A axis of the center O to be slightly different in the width W1, but in this case, it is possible to define an average value of the both parties as the width W1.

The advantages described above will hereinafter be proved based on the simulation result shown in FIG. 9. FIG. 9 is a graph showing a relationship between $W1^2/L1$ and the sensitivity ratio (%). In this drawing, the relationship between $W1^2/L1$ and the sensitivity ratio (%) in each of samples Mode101 through Mode136 shown in Table 1 described below is plotted, and further, a quadratic curve obtained by the least squares approximation is also shown. It should be noted that as is understood from Table 1, the samples Mode101 through Mode136 are different in the length L1, the width W1 and length L2 in a direction along the A axis of the element holder 43 from each other. Further, the length L1 is changed in a range of 150 μm through 700 μm, the width W1 is changed in a range of 50 μm through 200 μm, and the length L2 is changed in a range of 400 μm through 600 μm. Further, the "sensitivity ratio" representing the vertical axis in the drawing is a ratio between the detection sensitivity to the angular velocity ωc of the vibrator element 6 in the configuration in which the vibrator element 6 is mounted on the TAB substrate via the inner leads as described in Document 2 and the detection sensitivity of the vibrator element 6 in the present embodiment, and means that the higher the sensitivity ratio is, the higher sensitivity the sample has.

TABLE 1

|  | L1 (μm) | W1 (μm) | L2 (μm) | W1$^2$/L1 | SENSITIVITY RATIO |
|---|---|---|---|---|---|
| Model01 | 150 | 50 | 400 | 16.67 | 83.6 |
| Model02 | 250 | 50 | 400 | 10.00 | 90.0 |
| Model03 | 300 | 50 | 400 | 8.33 | 91.9 |
| Model04 | 500 | 50 | 400 | 5.00 | 95.9 |
| Model05 | 700 | 50 | 400 | 3.57 | 97.5 |
| Model06 | 300 | 100 | 400 | 33.33 | 77.5 |
| Model07 | 500 | 100 | 400 | 20.00 | 85.6 |
| Model08 | 300 | 150 | 400 | 75.00 | 61.9 |
| Model09 | 500 | 150 | 400 | 45.00 | 72.0 |
| Model10 | 700 | 150 | 400 | 32.14 | 74.4 |
| Model11 | 150 | 100 | 400 | 66.67 | 68.3 |
| Model12 | 650 | 100 | 400 | 15.38 | 88.7 |
| Model13 | 400 | 200 | 400 | 100.00 | 56.1 |
| Model14 | 300 | 50 | 500 | 8.33 | 91.3 |
| Model15 | 500 | 50 | 500 | 5.00 | 95.7 |
| Model16 | 700 | 50 | 500 | 3.57 | 97.7 |
| Model17 | 300 | 100 | 500 | 33.33 | 77.3 |
| Model18 | 500 | 100 | 500 | 20.00 | 85.8 |
| Model19 | 700 | 100 | 500 | 14.29 | 91.1 |
| Model20 | 300 | 150 | 500 | 75.00 | 62.2 |
| Model21 | 500 | 150 | 500 | 45.00 | 72.0 |
| Model22 | 700 | 150 | 500 | 32.14 | 80.9 |
| Model23 | 150 | 100 | 500 | 66.67 | 65.9 |
| Model24 | 150 | 50 | 500 | 16.67 | 82.8 |
| Model25 | 650 | 100 | 500 | 15.38 | 89.0 |
| Model26 | 400 | 200 | 500 | 100.00 | 57.0 |
| Model27 | 300 | 50 | 600 | 8.33 | 91.2 |
| Model28 | 500 | 50 | 600 | 5.00 | 95.7 |
| Model29 | 700 | 50 | 600 | 3.57 | 98.1 |
| Model30 | 150 | 100 | 600 | 66.67 | 66.5 |
| Model31 | 300 | 100 | 600 | 33.33 | 77.8 |
| Model32 | 500 | 100 | 600 | 20.00 | 86.4 |
| Model33 | 700 | 100 | 600 | 14.29 | 92.3 |
| Model34 | 650 | 100 | 600 | 15.38 | 91.0 |
| Model35 | 500 | 150 | 600 | 45.00 | 73.4 |
| Model36 | 300 | 150 | 600 | 75.00 | 63.1 |

As shown in the graph in FIG. 9, it is understood that when the relationship of W1$^2$/L1<30 is satisfied, the sensitivity ratio no lower than substantially 80% is achieved, and the detection sensitivity of the vibrator element 6 can be kept in a sufficiently high level. Furthermore, it is understood that when the relationship of W1$^2$/L1<12.5 is satisfied, the sensitivity ratio no lower than 90% is achieved, and the detection sensitivity of the vibrator element 6 can be kept in a higher level. According to such a simulation result, it is understood that the advantage that "it is possible to effectively prevent the degradation of the detection sensitivity of the vibrator element 6" described above can be obtained.

Here, when considering the sensitivity alone, the high sensitivity is more easily exerted in the configuration in which the vibrator element 6 is mounted on the TAB substrate via the inner leads as in the related art than in the configuration in which the vibrator element 6 is supported by the support 4 as in the present embodiment. However, in the configuration in which the vibrator element 6 is mounted on the TAB substrate via the inner leads, the processing variation is wide, and accordingly, there are the problem that an unwanted vibration easily occurs, and the problem that the processing variation is too wide, and thus, it is difficult to set conditions for reducing the unwanted vibration. In other words, the configuration in which the vibrator element 6 is mounted on the TAB substrate via the inner leads is capable of exerting the high detection sensitivity, but has the problem that the variation in the detection sensitivity is wide, and therefore, the yield ratio is low.

In contrast, in the configuration in which the vibrator element 6 is supported by the support 4 as in the present embodiment, it is difficult to exert the equivalent detection sensitivity to that in the configuration in which the vibrator element 6 is mounted on the TAB substrate via the inner leads. However, since the support 4 is formed of the quartz crystal substrate, the support 4 can accurately be processed with an etching process, and is therefore extremely small in processing variation. Further, since the processing variation is small, it is easy to set the conditions for reducing the unwanted vibration, accordingly. In other words, in the configuration in which the vibrator element 6 is supported by the support 4 as in the present embodiment, it is difficult to exert the high detection sensitivity, but has the advantage that the variation in the detection sensitivity is small, and thus, the yield ratio is high.

Therefore, in the present embodiment, in order to further exert the detection sensitivity equivalent to or even higher than the detection sensitivity in the configuration in which the vibrator element 6 is mounted on the TAB substrate via the inner leads while making use of the advantage, the relationship of W1$^2$/L1<30, or preferably the relationship of W1$^2$/L1<12.5, is satisfied as described above. Thus, it is possible for the vibrator device 1 to exert the extremely excellent advantage that the variation in detection sensitivity is small, and thus, the yield ratio is high while exerting the high detection sensitivity.

Further, in plan view from the direction along the C axis, the element holder 43 of the support 4 has the same shape as the element base 70 of the vibrator element 6. It should be noted that in FIG. 2, the element holder 43 is illustrated in a slightly larger size than the element base 70 for the sake of convenience of explanation. Further, in plan view from the direction along the C axis, the element holder 43 and the element base 70 overlap each other in the outer edge throughout the entire circumference of the outer edge. By making the element holder 43 and the element base 70 the same in shape as each other as described above, it is possible to reduce the size of the element holder 43 while ensuring the sufficient space for disposing the six bonding members B2 in the element holder 43. Further, since the element holder 43 is reduced in size, it is possible to increase the length L1 of the first beams 44, 44 accordingly, and it is possible to increase the detection sensitivity of the vibrator element 6. It should be noted that the expression that "the element holder 43 and the element base 70 are the same in shape" has the meaning of including when the each other's shapes have a slight error due to, for example, a manufacturing error or a manufacturing restriction in addition to when the each other's shapes completely coincide with each other.

It should be noted that the shape of the element holder 43 is not particularly limited, but can be smaller, or can also be larger than the element base 70. Further, it is also possible to be the same in planar shape as the element base 70, namely have a similarity shape to the element base 70, or different in planar shape therefrom.

The vibrator device 1 is hereinabove described. Such a vibrator device 1 is provided with the vibrator element 6 which makes the detection vibration in accordance with the angular velocity ωc as a physical quantity around the detection axis, the base 21, and the support 4 for supporting the vibrator element 6 with respect to the base 21 as described above. Further, in plan view from the thickness direction of the support 4, namely the direction along the C axis, the support 4 has the frame 41 shaped like a frame, the base mount 42 which is disposed outside the frame 41, and fixed to the base 21, the element holder 43 which is disposed inside the frame 41 and on which the vibrator element 6 is mounted, the pair of first beams 44, 44 which extend toward the both sides in the direction along the A axis as the first direction from the element holder 43 and couple the element holder 43 and the frame 41 to each other, and the pair of second beams 45, 45 which extend toward the both sides in the direction along the B axis as the second direction different from the direction along the A axis from the frame 41 and couple the frame 41 and the base mount 42 to each other. Further, in plan view from the direction along the C axis, when defining the length in the direction along the A axis of the first beam 44 as L1 (μm), and the width W in the direction along the B axis perpendicular to the direction along the A axis of the first beam 44 as W1 (μm), $W1^2/L1<30$ is satisfied. By adopting such a configuration, it is possible for the vibrator device 1 to exert the excellent advantage that the variation in detection sensitivity is small, and thus, the yield ratio is high while exerting the high detection sensitivity.

Further, as described above, the vibrator device 1 satisfies $W1^2/L1<12.5$. By satisfying such a relationship, it is possible for the vibrator device 1 to exert the more excellent advantage that the variation in detection sensitivity is small, and thus, the yield ratio is high while exerting the higher detection sensitivity.

Further, as described above, when defining the three axes perpendicular to each other as the A axis, the B axis, and the C axis, the thickness direction of the support 4 is parallel to the C axis, and the vibrator element 6 has the element base 70 fixed to the element holder 43, the pair of detection arms 71, 72 extending along the B axis from the element base 70, the pair of coupling arms 73, 74 extending along the A axis from the element base 70, the pair of drive arms 75, 76 extending along the B axis from the tip of the one coupling arm 73, and the pair of drive arms 77, 78 extending along the B axis from the tip of the other coupling arm 74. By adopting such a configuration, there is achieved the vibrator element 6 which is excellent in vibration balance, and has a high angular velocity detection characteristic.

Further, as described above, the first direction in which the first beams 44, 44 extend is parallel to the A axis, and the second direction in which the second beams 45, 45 extend is parallel to the B axis. Thus, the extending direction of the first beams 44, 44 and the extending direction of the second beams 45, 45 become perpendicular to each other, and thus, it is possible to effectively absorb or relax the stress with the support 4. Further, by extending the first beams 44, 44 along the A axis as the same direction as the extending direction of the coupling arms 73, 74, it is possible to easily ensure an equivalent length L1 to those of the coupling arms 73, 74.

Further, as described above, in plan view viewed from the direction along the C axis, the element holder 43 and the element base 70 are the same in shape as each other. Thus, it is possible to reduce the element holder 43 in size while ensuring the sufficient space for disposed the six bonding members B2 in the element holder 43. Further, since the element holder 43 can be reduced in size, it is possible to increase the length L1 of the first beams 44, 44 accordingly, and it is possible to increase the detection sensitivity of the vibrator element 6.

Second Embodiment

Figure 10:
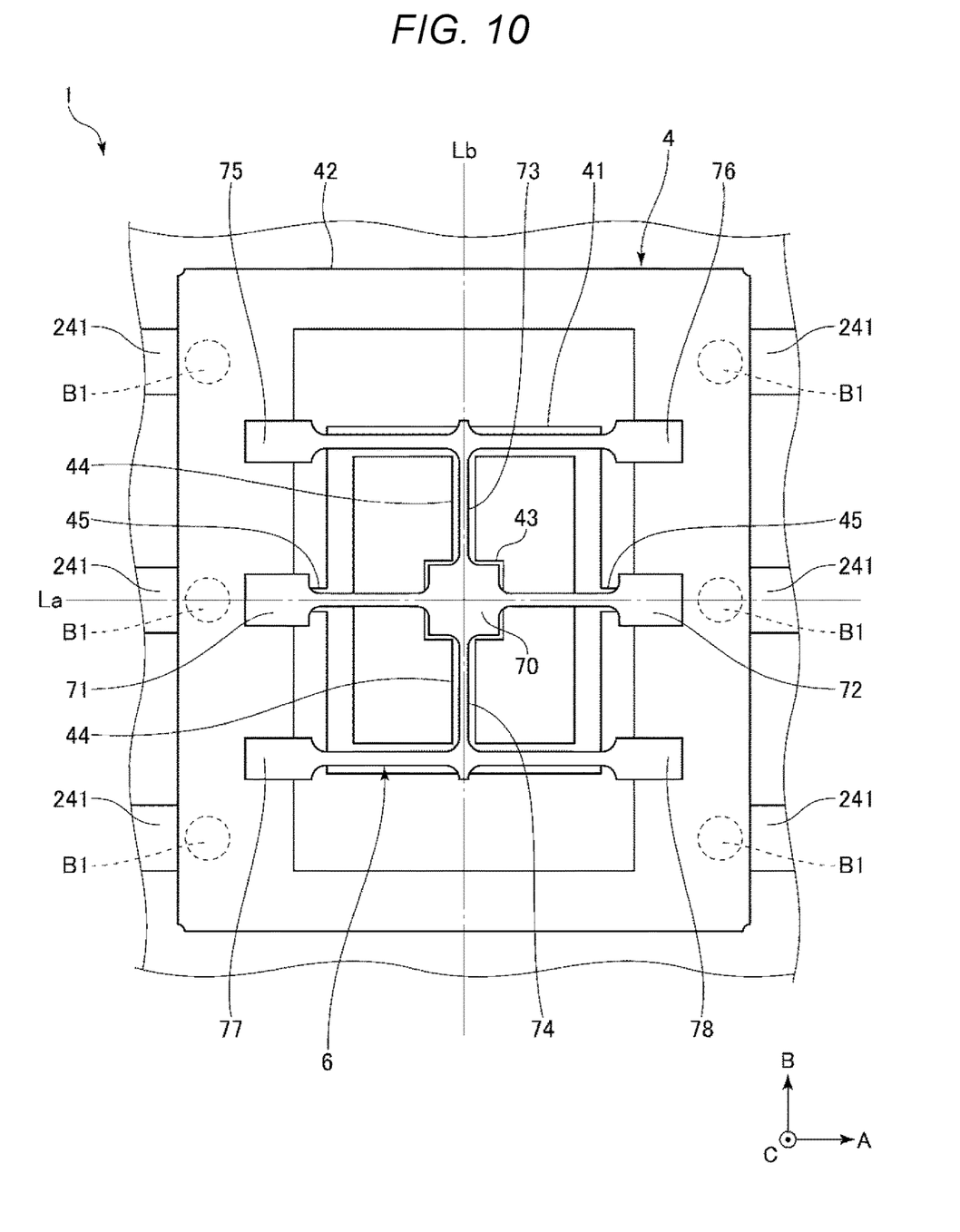
FIG. 10 is a plan view of a vibrator device according to a second embodiment.

FIG. 10 is a plan view of a vibrator device according to a second embodiment.

The present embodiment is substantially the same as the first embodiment described above except the point that the orientation of the vibrator element 6 and the configuration of the support 4 are different. It should be noted that in the following description, the present embodiment will be described with a focus on the difference from the embodiment described above, and the description of substantially the same issues will be omitted. Further, in FIG. 10, the constituents substantially identical to those of the embodiment described above are denoted by the same reference symbols.

As shown in FIG. 10, in the vibrator device 1 according to the present embodiment, the vibrator element 6 is fixed to the support 4 in a posture of rotating 90 degrees around the C axis with respect to the posture in the first embodiment.

Further, in the support 4, the pair of first beams 44, 44 are respectively located on the both sides in a direction along the B axis of the element holder 43, and couple the element holder 43 and the frame 41 to each other so as to achieve the fixed-fixed support of the element holder 43. Further, the pair of first beams 44, 44 are arranged on a straight line along the imaginary straight line Lb. Meanwhile, the pair of second beams 45, 45 are respectively located on the both sides in a direction along the A axis of the frame 41, and couple the frame 41 and the base mount 42 to each other so as to achieve the fixed-fixed support of the frame 41. Further, the pair of second beams 45, 45 are arranged on a straight line along the imaginary straight line La. According to such a configuration, since the coupling parts of the second beams 45, 45 to the base mount 42 and the internal terminals 241 come closer to each other compared to the first embodiment described above, it is possible to shorten the wiring length of the wiring patterns disposed on the support 4.

According also to such a second embodiment as described above, substantially the same advantages as in the first embodiment described above can be exerted.

Third Embodiment

Figure 11:
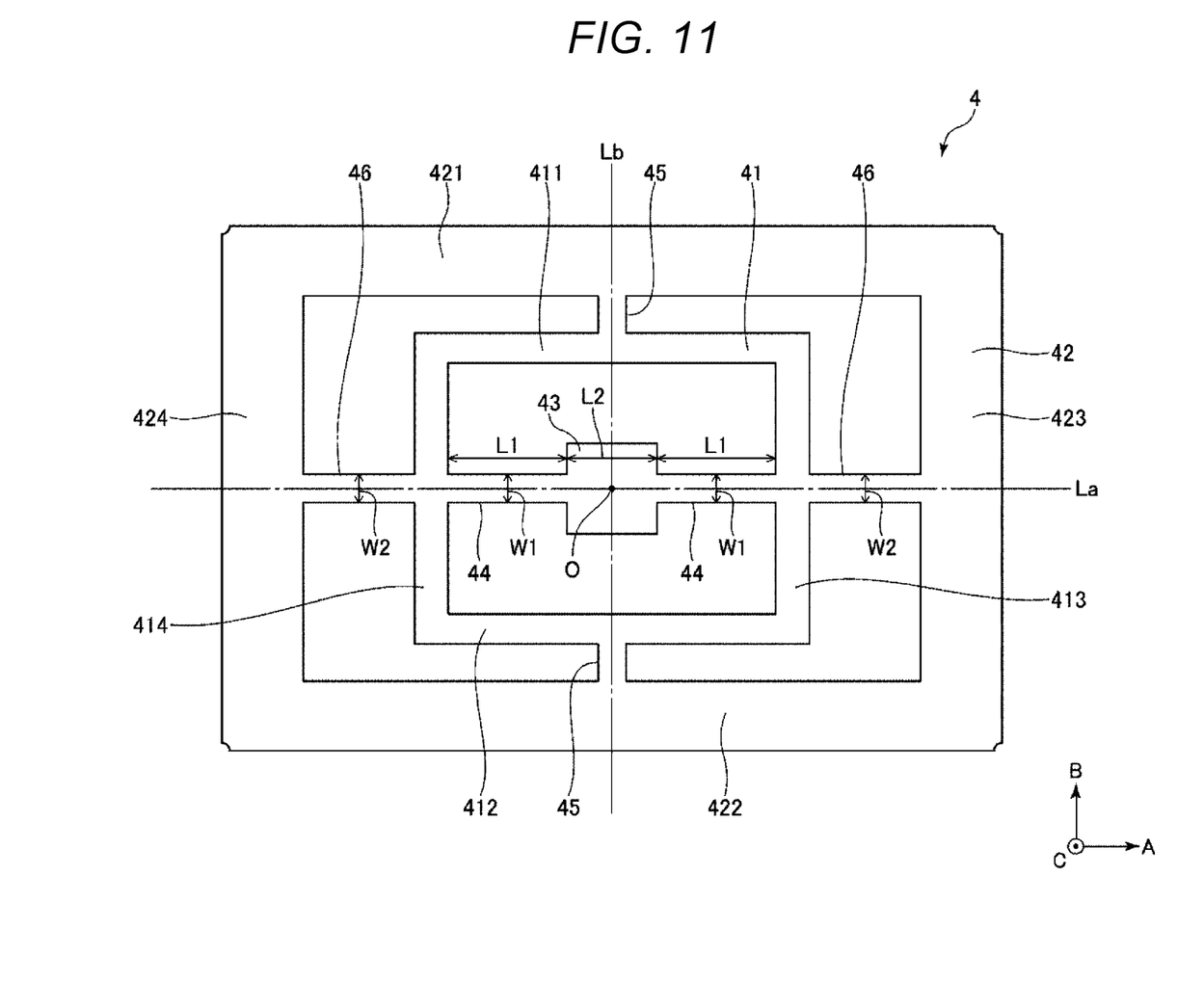
FIG. 11 is a plan view of a support provided to a vibrator device according to a third embodiment.

FIG. 11 is a plan view of a support provided to a vibrator device according to a third embodiment.

The present embodiment is substantially the same as the first embodiment described above except the point that the configuration of the support 4 is different. It should be noted that in the following description, the present embodiment will be described with a focus on the difference from the embodiment described above, and the description of substantially the same issues will be omitted. Further, in FIG. 11, the constituents substantially identical to those of the embodiment described above are denoted by the same reference symbols.

As shown in FIG. 11, the support 4 in the present embodiment is further provided with a pair of third beams 46, 46 which extend toward the both sides in a direction along the A axis from the frame 41, and couple the frame 41 and the base mount 42 to each other in addition to the configuration in the first embodiment. The pair of third beams 46, 46 are respectively located on the both sides in the direction along the A axis of the frame 41, and couple the frame 41 and the base mount 42 to each other so as to achieve the fixed-fixed support of the frame 41. In other words, in the support 4 in the present embodiment, there is adopted the configuration in which the frame 41 is supported from the four directions of the frame 41 by the pair of second beams 45, 45 and the pair of third beams 46, 46. Thus, the mechanical strength of the support 4 increases.

In particular, the pair of third beams 46, 46 are arranged on a straight line along the imaginary straight line La. In other words, the pair of third beams 46, 46 are arranged in alignment with the pair of first beams 44, 44. Therefore, it is possible to support the frame 41 from the four directions of the frame 41 in a more balanced manner. It should be noted that when the width W2 of the third beams 46, 46 is made excessively large, there is a possibility that the deterioration of the sensitivity of the vibrator element 6 is incurred. Therefore, the width W2 of the third beams 46, 46 is not particularly limited, but is preferably no larger than the width W1 of the first beams 44, 44.

As described above, in the vibrator device 1 according to the present embodiment, the support 4 has the pair of third beams 46, 46 which extend toward the both sides in the direction along the A axis as the first direction from the frame 41, and couple the frame 41 and the base mount 42 to each other, and the pair of third beams 46, 46 and the pair of first beams 44, 44 are arranged in alignment with each other. Thus, the frame 41 is supported from the four directions of the frame 41 by the pair of second beams 45, 45 and the pair of third beams 46, 46. Therefore, the mechanical strength of the support 4 increases.

According also to such a third embodiment as described above, substantially the same advantages as in the first embodiment described above can be exerted.

Although the vibrator device according to the present disclosure is hereinabove described based on the illustrated embodiments, the present disclosure is not limited to these embodiments, but the configuration of each of the components can be replaced with one having an identical function and an arbitrary configuration. Further, the present disclosure can also be added with any other constituents. Further, it is also possible to arbitrarily combine any of the embodiments with each other.

What is claimed is:

1. A vibrator device comprising:
a vibrator element configured to perform a detection vibration in accordance with a physical quantity around a detection axis;
a base; and
a support configured to support the vibrator element with respect to the base, wherein
the support includes, in a plan view from a thickness direction of the support,
a frame shaped like a frame,
a base mount disposed outside the frame, and fixed to the base,
an element holder which is disposed inside the frame, and on which the vibrator element is mounted,
a pair of first beams which extend along a first direction from the element holder, and couple the element holder and the frame to each other, and
a pair of second beams which extend along a second direction different from the first direction from the frame, and couple the frame and the base mount to each other, and $$W1^2/L1<30$$

in which, in plan view, a length in the first direction of the first beam is L1 (μm), and a width in a direction perpendicular to the first direction of the first beam is W1 (μm).

2. The vibrator device according to claim 1, wherein $$W1^2/L1<12.5.$$

3. The vibrator device according to claim 1, wherein
defining three axes perpendicular to each other as an A axis, a B axis, and a C axis,
the thickness direction of the support is parallel to the C axis, and
the vibrator element includes
an element base fixed to the element holder,
a pair of detection arms extending along the B axis from the element base,
a pair of coupling arms extending along the A axis from the element base,
a pair of the drive arms extending along the B axis from a tip of one of the coupling arms, and
a pair of the drive arms extending along the B axis from a tip of another of the coupling arms.

4. The vibrator device according to claim 3, wherein
the first direction is parallel to the A axis, and
the second direction is parallel to the B axis.

5. The vibrator device according to claim 3, wherein
in a plan view viewed from a direction along the C axis, the element holder and the element base are same in shape.

6. The vibrator device according to claim 1, wherein
the support includes a pair of third beams which extend along the first direction from the frame, and couple the frame and the base mount to each other, and
the pair of third beams and the pair of first beams are arranged in alignment with each other.

* * * * *